United States Patent
Nakano et al.

(10) Patent No.: US 6,874,817 B2
(45) Date of Patent: Apr. 5, 2005

(54) SEATBELT DEVICE

(75) Inventors: Yoshiyuki Nakano, Shiga (JP); Masahiko Iwai, Shiga (JP); Tadahiro Nakayama, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/064,054

(22) Filed: Jun. 5, 2002

(65) Prior Publication Data

US 2002/0185852 A1 Dec. 12, 2002

(30) Foreign Application Priority Data

Jun. 6, 2001 (JP) .......................................... 2001-171513
Mar. 29, 2002 (JP) .......................................... 2002-093976

(51) Int. Cl.⁷ .......................... B60R 22/28; B60R 22/36
(52) U.S. Cl. .................................... 280/805; 280/806
(58) Field of Search ................................ 280/805, 806; 60/638

(56) References Cited

U.S. PATENT DOCUMENTS

| | | | | |
|---|---|---|---|---|
| 3,862,673 A | * | 1/1975 | Benson | 188/268 |
| 3,871,470 A | * | 3/1975 | Schwanz et al. | 297/480 |
| 3,901,345 A | * | 8/1975 | Fieni | 280/805 |
| 4,258,934 A | * | 3/1981 | Tsuge et al. | 280/806 |
| 4,573,322 A | * | 3/1986 | Fohl | 60/638 |
| 4,669,354 A | * | 6/1987 | Lucy | 89/1.14 |
| 4,840,325 A | * | 6/1989 | Higuchi et al. | 242/374 |
| 5,374,110 A | * | 12/1994 | Hiramatsu | 297/480 |
| 5,411,291 A | * | 5/1995 | Fohl | 280/806 |
| 5,468,019 A | * | 11/1995 | Blase et al. | 280/805 |
| 5,588,677 A | * | 12/1996 | Kopetzky et al. | 280/806 |
| 5,707,080 A | * | 1/1998 | Isaji et al. | 280/806 |
| 5,871,235 A | * | 2/1999 | Wier | 280/806 |
| 5,944,350 A | * | 8/1999 | Grabowski et al. | 280/806 |
| 6,155,727 A | | 12/2000 | Wier | |
| 6,213,513 B1 | * | 4/2001 | Grabowski et al. | 280/806 |
| 6,250,720 B1 | * | 6/2001 | Wier | 297/468 |

FOREIGN PATENT DOCUMENTS

| | | |
|---|---|---|
| DE | 88 12 852 | 12/1988 |
| WO | WO 97/39923 | 10/1997 |

* cited by examiner

Primary Examiner—Teri Pham Luu
Assistant Examiner—Bret Hayes
(74) Attorney, Agent, or Firm—Foley & Lardner LLP

(57) ABSTRACT

A seat belt device including a shock absorbing mechanism to gently stop a pull-in member and to prevent a large impact force from being exerted on the pull-in member when the pull-in member is pulled in by a pre-tensioner. The device may include a wire pulled by operation of a buckle pre-tensioner at the time of an emergency, a buckle is pulled in towards a bracket while a cover contracts. Before the cover contracts to a maximum permissible contraction position, the buckle comes into contact with the free end of a shock absorbing member, and, then, is pulled in while the shock absorbing member is caused to contract. By the contraction of the shock absorbing member, the shock absorbing member absorbs impact energy of the buckle.

17 Claims, 6 Drawing Sheets

SEATBELT DEVICE

BACKGROUND

The present invention relates to, for example, the technical field of a seatbelt device attached to a seat of a vehicle, such as an automobile. More particularly, the present invention relates to a seatbelt device which can constrain an occupant by placing a seatbelt under tension by operating a pre-tensioner at the time of an emergency, such as a collision of the vehicle.

Conventionally, a seatbelt device is attached to a seat of a vehicle, such as an automobile. When a very large deceleration of a vehicle occurs at the time of an emergency, such as a collision of the vehicle, a seatbelt constrains an occupant and restricts the inertial movement of the occupant in order to protect the occupant. Certain seatbelt devices include a pre-tensioner which constrains an occupant quickly and with a large constraining force by placing the seatbelt under tension at the time of the aforementioned emergency. In general, the pre-tensioner is provided at a seatbelt retractor of the seatbelt device, but may also be provided at a buckle or a lap anchor section.

The retractor is typically one of several types including, for example, an emergency seatbelt retractor (ELR), an ELR including a pre-tensioner, and an ELR including a load limiter that absorbs impact energy by limiting the load exerted on the seatbelt during an emergency.

In an emergency, when the pre-tensioner operates to pulls the seatbelt substantial force is applied to seatbelt. As a result, a large shock is applied to the components of the seatbelt device including, for example, the buckle. Therefore, there is a need for a seatbelt device that provides for increased shock absorption upon operation of the pre-tensioner.

SUMMARY OF THE INVENTION

One object of the present invention is to provide a seatbelt device which makes it possible to more effectively and gently stop a pull-in member and to further enhance shock absorption performance of shock exerted on the pull-in member or a member disposed near the pull-in member and affected by a pulling-in operation of the pull-in member even when the pull-in member is pulled in to its stopping state by a pre-tensioner.

According to one embodiment of the present invention, there is provided a seatbelt device that includes a pre-tensioner for pulling a seatbelt by pulling in a pull-in member at the time of an emergency. The device further includes a shock absorbing means for absorbing shock produced when the pull-in member is stopped.

The seatbelt device may further include a member disposed near the pull-in member and affected by the pulling-in operation of the pull-in member. In an exemplary embodiment, the pull-in member is a buckle and/or a lap anchor.

In an alternative embodiment of the present invention, the seatbelt device includes a wire disposed near the pull-in member and is connected to the pre-tensioner. The wire is used for pulling in the pull-in member. The shock absorbing means has a wire holding capability for holding the wire at a predetermined angle with respect to a direction in which the pre-tensioner pulls.

According to the present invention, the operation of the pre-tensioner causes the pull-in member to be pulled in at the time of an emergency. Then, the pull-in member comes into contact with the shock absorbing means, and, by the shock absorbing means, impact energy produced at the time the pull-in member reaches the stopping state is absorbed, so that shock performance is further enhanced. By this, the pull-in member is stopped more gently.

According to an embodiment of the present invention, by absorbing impact energy produced when the pull-in member reaches its stopping state by the shock absorbing means, impact force exerted on a member disposed near the pull-in member and affected by the pulling-in operation of the pull-in member is greatly reduced.

Furthermore, according to an embodiment of the present invention, impact energy produced when the buckle and/or the lap anchor are stopped is absorbed, so that shock performance is further enhanced. By this, the buckle and/or the lap anchor are stopped more effectively and gently.

Furthermore, since the wire is held by the shock absorbing means at a desired predetermined angle with respect to the direction in which the pre-tensioner pulls, it is possible to prevent opening of a holding angle caused by a repulsive property of the wire, so that the buckle can be reliably set at a desired location. In addition, since the shock absorbing means has a wire holding capability, it is not necessary to provide a special means for holding the wire at a predetermined angle, thereby reducing the number of component parts and making the structure simpler.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereunder, an embodiment of the present invention will be given using the drawings.

Figure 5:
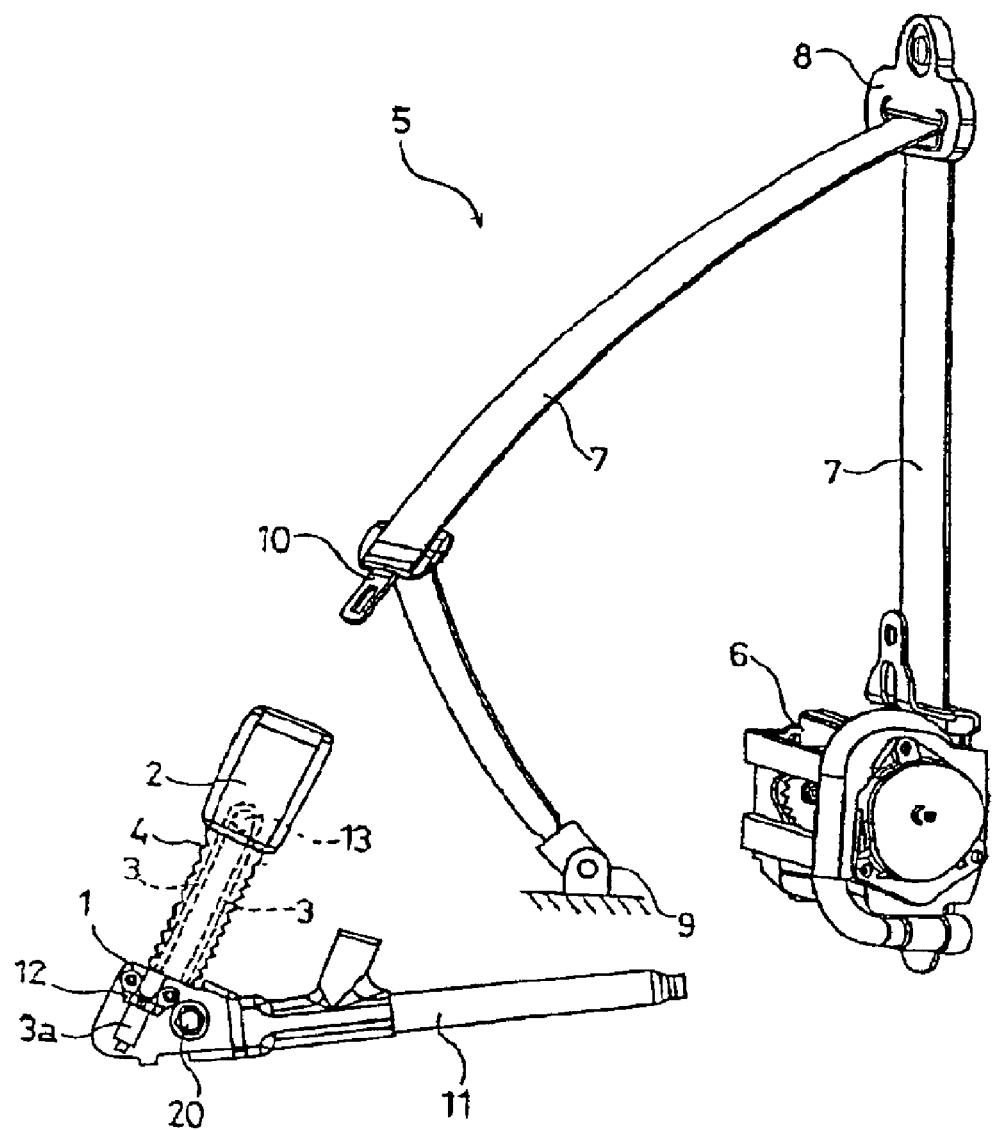
FIG. 5 is a schematic view of a seatbelt device having a pre-tensioner provided a buckle.
Figure 6:
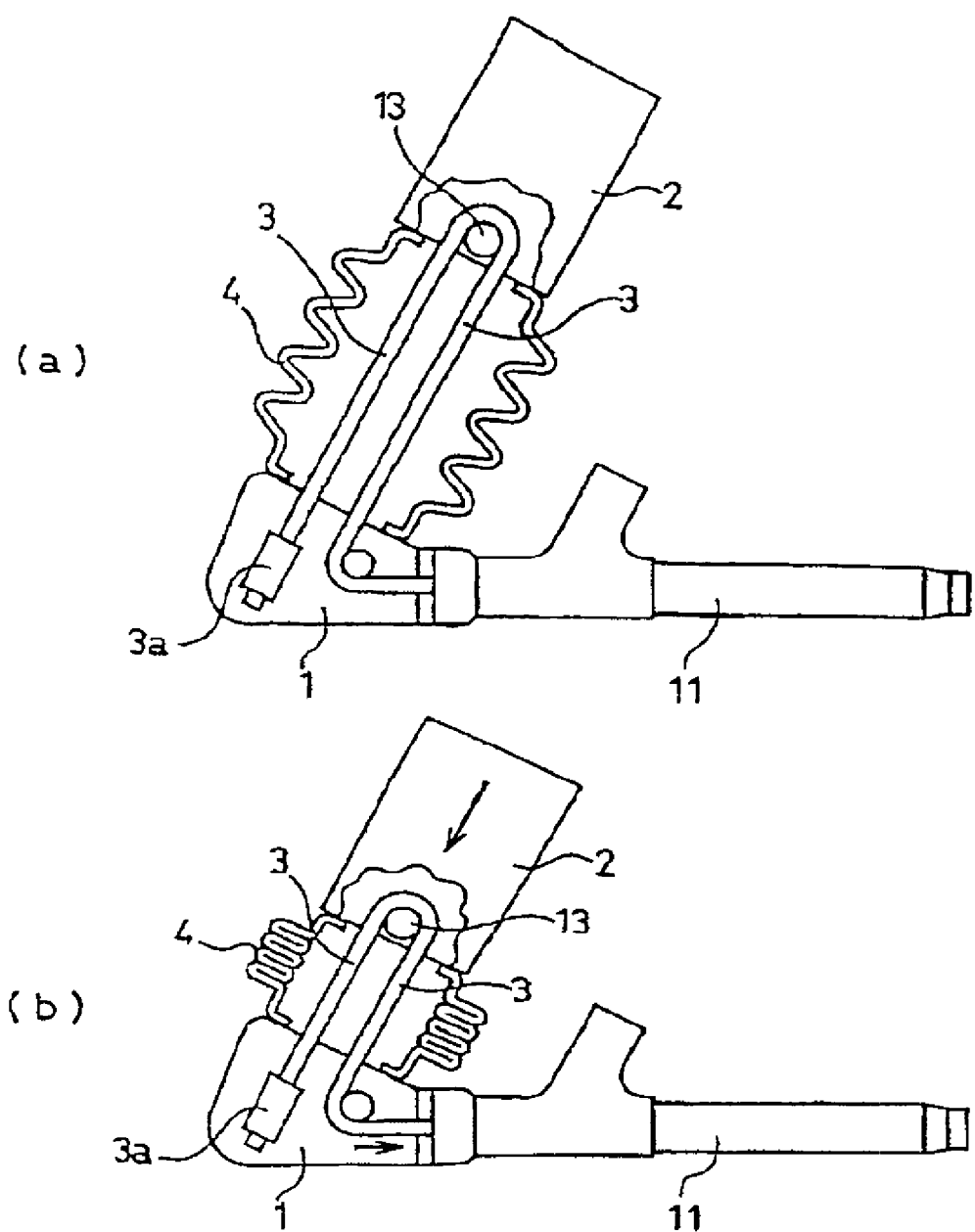
FIG. 6 illustrates the behavior of the buckle of the related seatbelt device shown in FIG. 5, in which 6(a) illustrates an ordinary state, and 6(b) illustrates an operation state.

FIG. 5 is a schematic view of an exemplary seatbelt device having a pre-tensioner provided at a buckle. FIG. 6 illustrates the behavior of the buckle in the seatbelt device. As shown in FIG. 5 and FIG. 6(a), the seatbelt device 5 includes a seatbelt retractor 6 secured to, for example, the floor of a vehicle body. The device 5 also includes a belt guide 8 which is mounted to, for example, a center pillar of the vehicle body in order to guide a seatbelt 7 from the seatbelt retractor 6 to a predetermined location with respect to an occupant. A lap anchor 9 is also provided. The anchor 9 is secured to, for example, a portion of the vehicle-body floor or the like. The anchor 9 is positioned towards the vehicle-body outer side of a vehicle seat (not shown), and has an end of the seatbelt 7 connected thereto. A tongue 10 is slidably supported at the seatbelt 7. The tongue 10 engages with a buckle 2 which is secured to, for example, a portion of the vehicle-body floor or the like disposed towards the vehicle-body inner side of the vehicle seat (not shown). A bracket 1 is secured to the vehicle floor (not shown) and supports the buckle 2. A stretchable and contractible cover 4 is placed between the buckle 2, the bracket 1 and the buckle pre-tensioner 11.

The retractor 6 may be one of several types including, for example, an emergency seatbelt retractor (ELR), an ELR including a pre-tensioner, and an ELR including a load limiter that absorbs impact energy by limiting the load exerted on the seatbelt 7 during an emergency.

The buckle 2 is supported by the bracket 1 and moves relative to the bracket 1 in the longitudinal direction of the buckle 2 (slightly obliquely upward and downward in FIG. 5). One end 3a of a wire 3 is connected to the bracket 1 by a connecting member 12. The wire 3 wraps around a pulley 13 that is rotatably supported at the buckle 1. The other end of the wire 3 is connected to a piston (not shown) of the buckle pre-tensioner 11. In general, at the time of an emergency, the piston of the buckle pre-tensioner 11 pulls the wire 3 with a relatively large force. The piston is driven by the force of a high-pressure reaction gas produced by a reaction in a reacting substance.

The cover 4 for the wire is located between the bracket 1 and the buckle 2. The cover 4 is formed of rubber or resin having a property equivalent to the property of rubber, and is formed into a cylindrical shape with accordion-like folds. When the wire 3 is pulled by the buckle pre-tensioner 11, the buckle 2 is pulled towards the bracket 1. The cover 4 readily contracts or compresses, thereby allowing the buckle 2 to move easily move towards the bracket 1.

The pre-tensioner 11 pulls the seatbelt 7 when, at the time of the aforementioned emergency, a high-pressure reaction gas is produced by causing reaction in a reacting substance, so that the buckle 2 is pulled towards the bracket 1 through the wire 3 by the reaction gas.

The seatbelt 7 is fastened around the occupant by engaging the tongue 10 with the buckle 2 after the seatbelt 7 has been pulled out from the seatbelt retractor 6 and placed on the shoulders, chest, and waist of an occupant. While fastened, the seatbelt 7 is made to fit around the occupant and be wound up and drawn out by the seatbelt retractor 6. The seatbelt 7 is normally relatively loosely wound up to an extent not causing the occupant to feel constrained. During normal conditions, as shown in FIG. 5 and FIG. 6(a), the buckle 2 is held at a predetermined location furthest from the bracket 1.

At the time of an emergency, even if the occupant tries to move forward due to inertia, the seatbelt 7 is prevented from being drawn out by the seatbelt retractor 6, thereby constraining and protecting the occupant. At this time, the buckle pre-tensioner 11 operates and, as mentioned above, pulls the wire 3 with a relatively large force, so that the cover 4 is readily deformed in the longitudinal direction. The buckle 2 is pulled in the direction of the bracket 1 (slightly obliquely downward in FIG. 5). Therefore, the seatbelt 7 is quickly brought under tension, so that the constraining force of the seatbelt 7 on the occupant increases.

However, when, as mentioned above, the wire 3 is pulled with a large force by the operation of the buckle pre-tensioner 11, the buckle 2 is pulled in the direction of the bracket 1 from its ordinary state shown in FIG. 6(a), the buckle 2 may get pulled in until it reaches a stopping state corresponding the maximum contraction of the cover 4 as shown in FIG. 6(b). When the buckle 2 reaches the stopping state it stops abruptly, the cover 4 is sandwiched and pressed between the bracket 1 and the buckle 2 (both relatively hard members) so that shock may be exerted on the buckle 2 and the cover 4. The cover 4 provides for shock absorption due to the accordion-like folds.

In the above-described seatbelt device, the buckle pre-tensioner 11 is provided at the buckle-2 side. However, in alternative embodiments, the pre-tensioner may be provided at the lap-anchor-9 side shown in FIG. 5. In that case also, a member that holds an end portion of the seatbelt 7 may reach its stopping state with respect to the lap anchor 9. A cover with accordion-like folds may be provided to absorb shock and relatively gently stop the member holding an end portion of the seatbelt 7.

Figure 1:
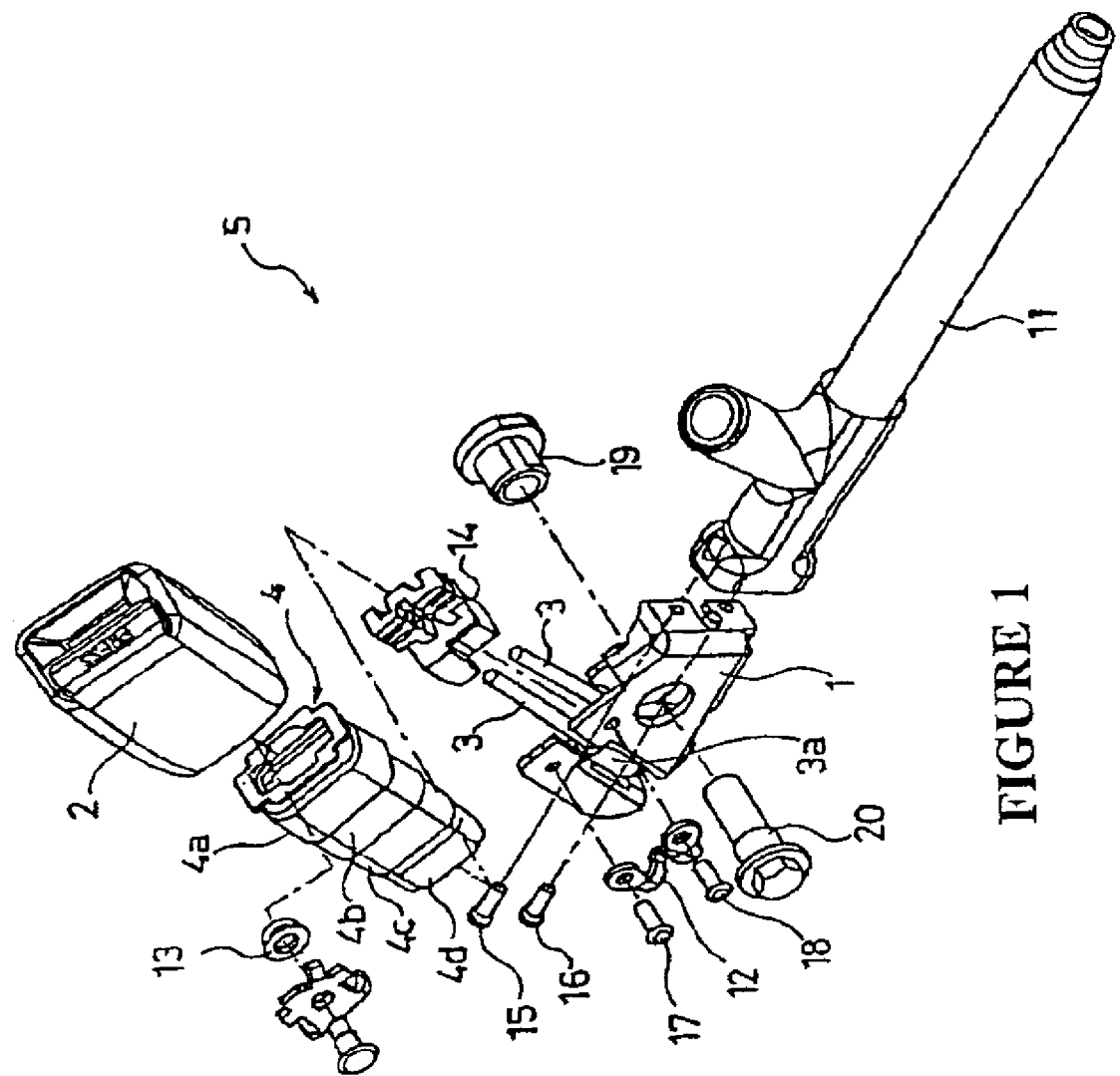
FIG. 1 is an exploded perspective view partly and schematically showing a buckle of a seatbelt device of an embodiment of the present invention.
Figure 2:
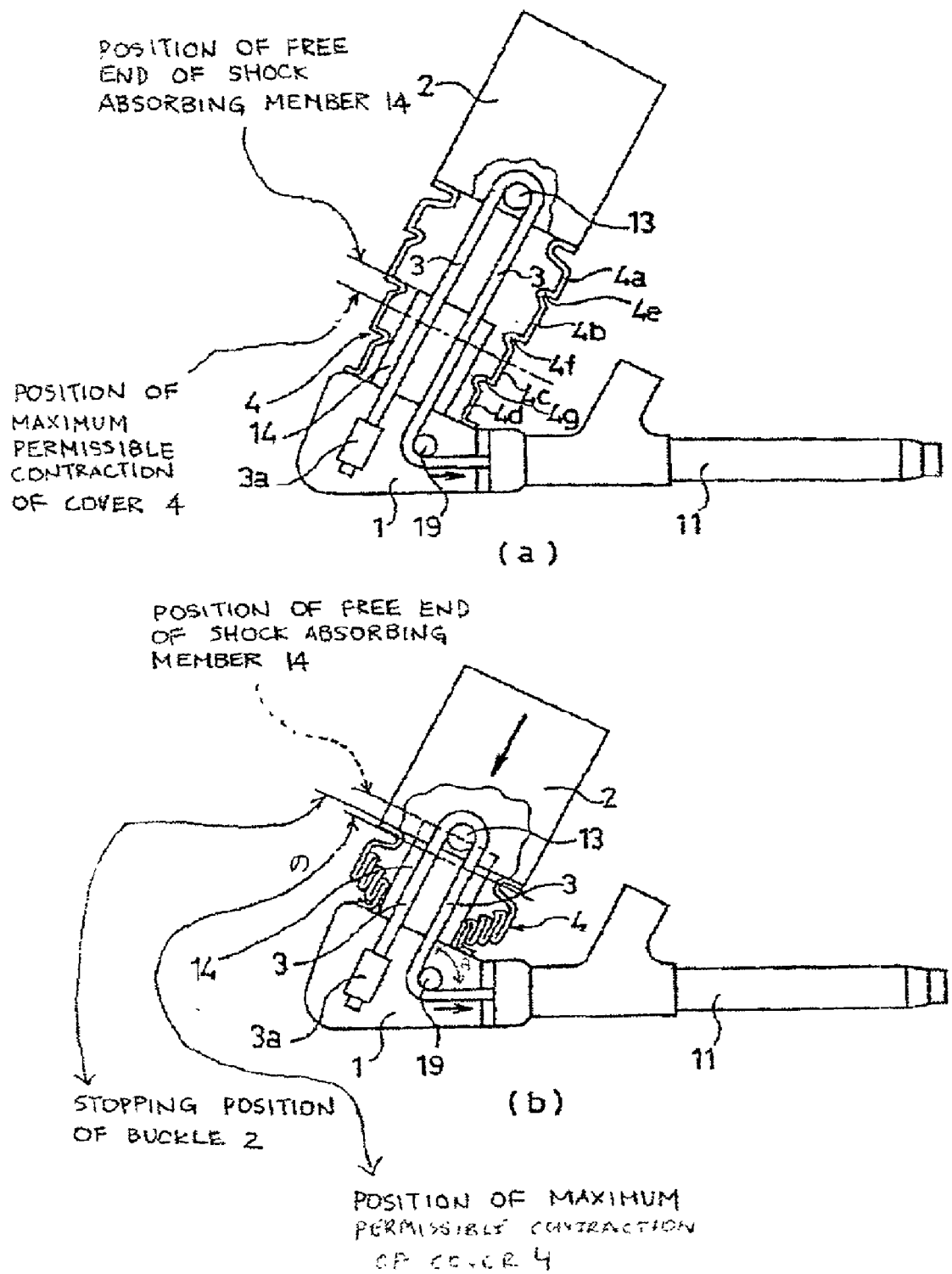
FIG. 2 illustrates the behavior of the buckle of the seatbelt device of the embodiment shown in FIG. 1, in which 2(a) illustrates an ordinary state, and 2(b) shows an operation state.

FIG. 1 is an exploded perspective view schematically and partly showing a buckle of another embodiment of a seatbelt device in accordance with the present invention. FIG. 2 illustrates the behavior of the buckle in the seatbelt device of this embodiment.

Figure 3:
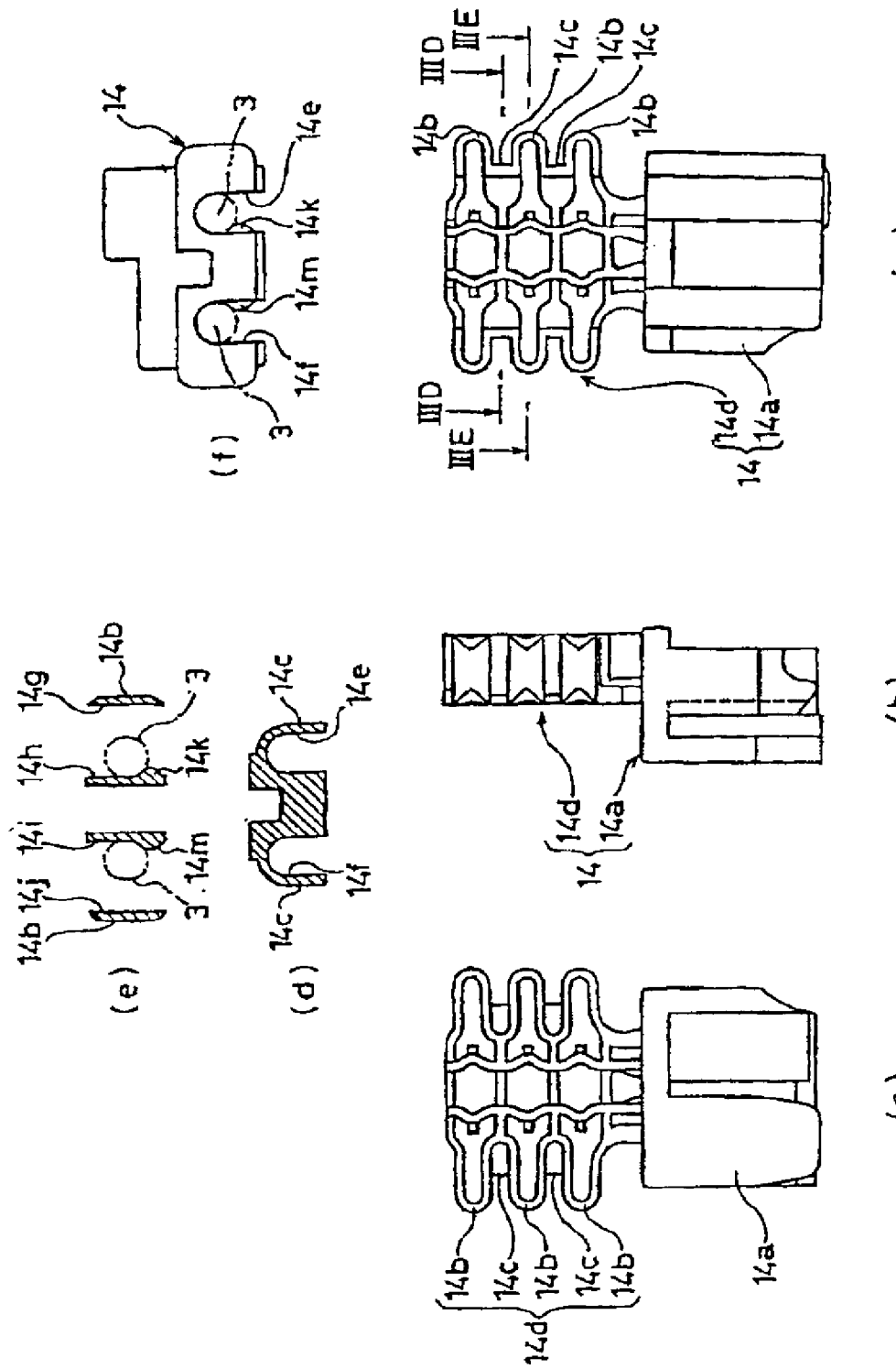
FIG. 3 illustrates a shock absorbing member used in the seatbelt device of the embodiment shown in FIG. 1, in which 3(a) is a front view, 3(b) is a left side view, 3(c) is a back view, 3(d) is a sectional view taken along line IIID—IIID of 3(a), 3(e) is a sectional view taken along line IIIE—IIIE of 3(a), and 3(f) is a top view.

As shown in FIG. 1 and FIG. 2(a), a seatbelt device 5 is provided. The device 5 includes a shock absorbing mechanism. The shock absorbing mechanism may include both the cover 4 and a compressible shock absorbing member 14 being mounted to a bracket 1 inside a cover 4. As shown in FIGS. 3(a) to 3(c), the shock absorbing member 14 comprises a relatively rigid mounting base portion 14a mounted to the bracket 1, and a compressible shock absorbing portion 14d with accordion-like folds including protrusions 14b protruding sideways and recesses 14c that are recessed sideways. In the shock absorbing member 14, the mounting base portion 14a and the shock absorbing portion 14d are integrally formed or formed as separate portions using rubber or resin having a property equivalent to that of rubber.

Under ordinary conditions where a buckle 2 is not pulled in by the pre-tensioner 11, as shown in FIG. 2(a), the buckle 2 is separated from a free end of the shock absorbing member 14 (that is, a free end of the shock absorbing portion 14d). The position of the free end of the shock absorbing member 14 is set at the buckle side from a maximum permissible contraction position of the cover 4. Then, when the buckle 2 is pulled in by operation of the pre-tensioner 11 as mentioned above, the buckle (i.e., pull-in member) 2 comes into contact with the free end of the shock absorbing member 14 before the buckle 2 is pulled to the maximum permissible contraction position of the cover 4, so that the shock absorbing member 14 contracts, thereby absorbing and reducing the shock of the buckle 2.

As shown in FIG. 3(d), a pair of U-shaped grooves 14e and 14f are formed portions of the shock absorbing portion 14 corresponding to the recesses 14c. As shown in FIG. 3(a), such a pair of U-shaped grooves 14e and 14f are also provided at the mounting base portion 14a so as to extend in the vertical direction. The bottom portions of the grooves 14e and 14f are formed into semi-circular shapes having diameters that are equal to or slightly larger than the diameter of a wire 3. As shown in FIG. 3(e), portions of the shock absorbing portion 14d corresponding to the protrusions 14b comprise two pairs of side walls 14g and 14h and 14i and 14j. The intervals of these side walls 14g and 14h and 14i and 14j are set larger than the diameter of the wire 3. Retainer protrusions 14k and 14m protruding towards the corresponding side walls 14g and 14j are formed at the side walls 14h and 14i.

As shown in FIG. 3(f), by the grooves 14e and the retainer protrusions 14k formed at the mounting base portion 14a and the shock absorbing portion 14d, respectively, the wire 3 is slidably held at predetermined locations of the shock absorbing portion 14d, and, similarly, by the groove 14f and the retainer protrusions 14m formed at the mounting base portion 14a and the shock absorbing portion 14d, respectively, the wire 3 is slidably held at the predetermined locations of the shock absorbing portion 14d. In other words, the shock absorbing member 14 is also capable of holding the wire 3. As shown in FIG. 2(a), the shock absorbing member 14 holds the wire 3 at a desired predetermined angle θ with respect to the direction in which the buckle pre-tensioner 11 pulls. By holding the wire 3 at an angle by means of bending the wire 3 in this way, it is possible to prevent opening of the angle θ in the direction in which it becomes large caused by the repulsive nature of the wire 3, so that the buckle 2 can be set at a desired predetermined location.

When an external force is exerted on the wire 3 held by the shock absorbing portion 14d, the shock absorbing portion 14d deforms readily in the direction of the external force.

The cover 4 includes four portions 4a, 4b, 4c, and 4d, with the topmost portion 4a being connected to the buckle 2, and with the bottommost portion 4d being inserted into the shock absorbing member 14. The transverse cross-sectional shapes of the portions 4a, 4b, 4c, and 4d are similar in that they are rectangular shapes with corners that are chamfered so as to have round forms. In this case, in FIG. 1 and FIG. 2a, the size of the transverse cross-sectional shape of the topmost portion 4a (disposed closest to the buckle 2) is the largest, and the sizes of the other transverse cross-sectional shapes of the portions 4b, 4c, and 4d are set so as to become progressively smaller towards the bracket 1. The portions 4a, 4b, and 4c can move into the regions of the portions 4b, 4c, and 4d disposed directly below them, respectively.

The bottom end peripheral edge of the topmost portion 4a and the top end peripheral edge of the next portion 4b are connected together by an annular connecting portion 4e; the bottom end peripheral edge of the portion 4b and the top end peripheral edge of the next portion 4c are connected together by an annular connecting portion 4f; and the bottom end peripheral edge of the portion 4c and the top end peripheral edge of the next portion 4d are connected together by an annular connecting portion 4g. The cover 4 is also integrally formed using resinous material, such as polyethylene or polypropylene, or rubber.

In FIG. 1, reference numerals 15 and 16 denote screws for mounting the bracket 1 to a housing of the buckle pre-tensioner 11; reference numerals 17 and 18 denote screws for mounting a connecting member 12 to the bracket 1; reference numeral 19 denotes a collar, mounted to the bracket, for slidably guiding the wire 3; and reference numeral 20 denotes a bolt for mounting the attached buckle pre-tensioner 11 to a vehicle.

The other structural features of the seatbelt device 5 of the embodiment shown in FIG. 1 are essentially the same as those of the above-described related seatbelt device 5.

In the seatbelt device 5 of this embodiment having such a structure, under ordinary conditions, the buckle 2 is held at a predetermined location shown in FIG. 2(a). Here, the buckle 2 is separated from the shock absorbing member 14, and the free end of the shock absorbing member 14 is positioned at the buckle side from the maximum permissible contraction position.

As a result, when an emergency occurs, the buckle pre-tensioner 11 operates, so that the wire 3 is pulled. Movement of the wire causes the buckle 2 to be pulled towards the bracket 1 (in the direction of the arrow shown in FIG. 2(b)) while the cover 4 contracts. The cover 4 contracts so that a buckle-side portion of the cover 4 is positioned at the outer side of a bracket-side portion of the cover formed continuously with the buckle-side portion of the cover.

Since the free end of the shock absorbing member 14 is positioned at the buckle side from the maximum permissible contraction position of the cover 4, the buckle 2 comes into contact with the free end of the shock absorbing member 14 before the cover 4 contracts to the maximum permissible contraction position, so that, thereafter, the buckle 2 is pulled in while the shock absorbing member 14 contracts.

As a result of the contraction of the shock absorbing member 14, the shock absorbing member 14 absorbs impact energy of the buckle 2, so that shock absorption performance is further enhanced, and the shock produced when the buckle 2 comes into contact with the free end of the shock absorbing member 14 is reduced. As a result, the buckle 2 comes into contact with the shock absorbing member 14 more effectively and gently.

As shown in FIG. 2(b), when the pressing force of the buckle 2 with respect to the shock absorbing member 14 based on the pulling force of the buckle pre-tensioner 11 is equal to the opposing force of the shock absorbing member 14, the buckle 2 stops being pulled in, that is, the buckle 2 reaches a stopping state. Since the shock absorbing member 14 absorbs impact energy of the buckle 2, the buckle 2 is gently stopped, and impact force exerted on the buckle cover is greatly reduced.

As shown in FIG. 2(b), the stopping position of the buckle 2 in this embodiment is set in front of the maximum permissible contraction position of the cover 4. Therefore, in this case, impact energy absorption effect by the shock absorbing member 14 can be maximized.

However, the stopping position of the buckle 2 is not limited thereto, so that it can be set at the maximum permissible contraction position of the cover 4. In this case, it is possible to obtain impact energy absorption effect by the shock absorbing member 14 that is substantially the same as that obtained in the case shown in FIG. 2(b). Although, under ordinary conditions, the buckle 2 is separated from the shock absorbing member 14, the buckle 2 may be set in contact with the shock absorbing member 14 even under ordinary conditions.

Since the wire 3 is held at an angle, and, is, thus, held in a bent state, it is possible to set the buckle 2 at a desired specified location by preventing angle opening caused by the repulsive property of the wire 3.

The other operational advantages of the seatbelt device S of the embodiment of FIGS. 1 and 2 are essentially the same as those of the above-described embodiment shown in FIGS. 5 and 6.

FIGS. 4(a) to (d) are perspective views of alternative embodiments of the shock absorbing member of the seatbelt device of the present invention.

Figure 4:
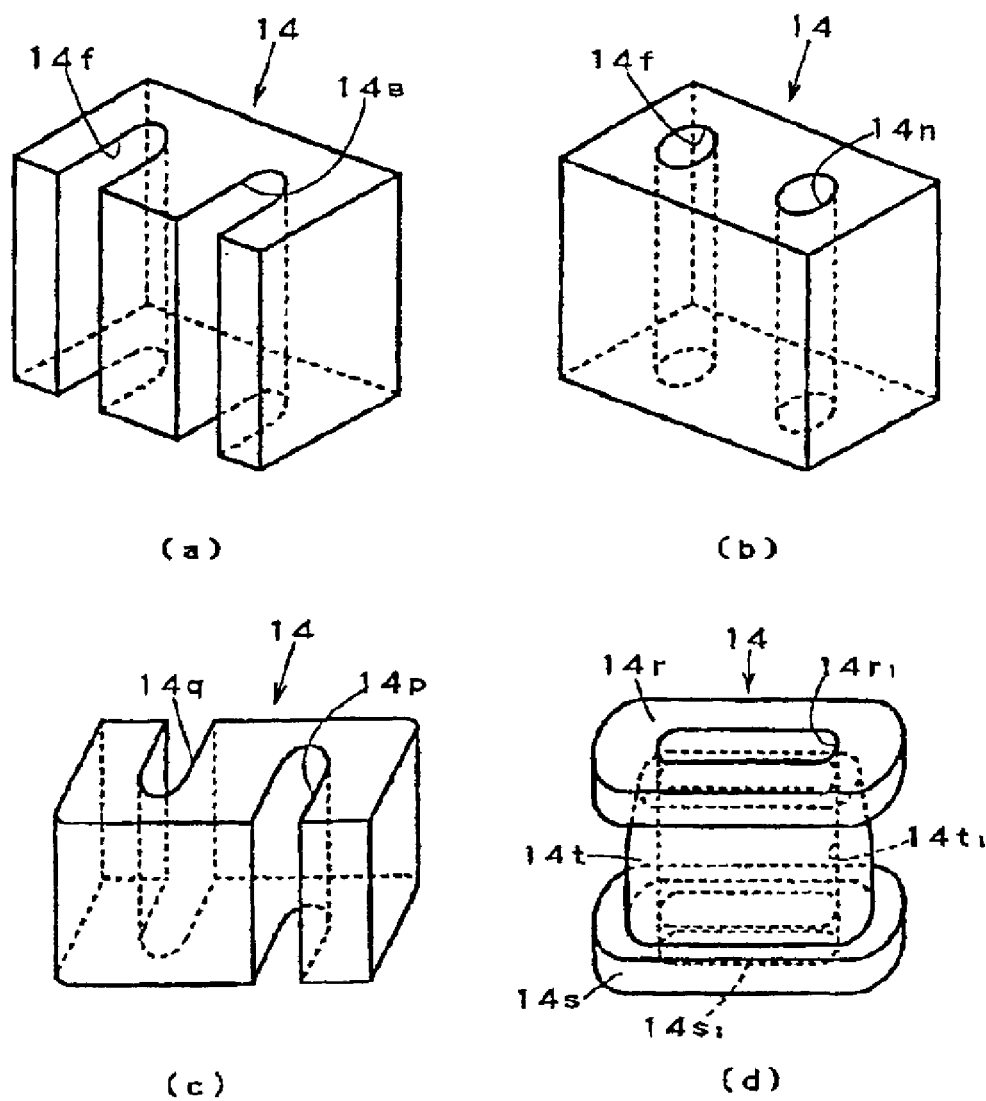
FIGS. 4(a) to 4(d) are perspective views of modifications of the shock absorbing member of the seatbelt device of the present invention.

The shock absorbing member 14 shown in FIG. 4(a) is formed in the form of a block including a pair of wire guide holding grooves 14e and 14f for holding and guiding the wire 3, using rubber or resin having a property equivalent to that of rubber. It does not have accordion-like folds as in the previous embodiment. In this embodiment, although not shown, retainer protrusions 14k and 14m, like those mentioned above, may be formed in the wire guide holding grooves 14e and 14f.

In another modification of the shock absorbing member 14 shown in FIG. 4(b), the pair of wire guide holding grooves 14e and 14f of the shock absorbing member 14 shown in FIG. 4(a) are replaced by a pair of wire guide holding holes 14n and 14o.

In still another modification of the shock absorbing member 14 shown in FIG. 4(c), the pair of wire guide holding grooves 14e and 14f which both open in the same directions in the shock absorbing member 14 shown in FIG. 14(a) are replaced by a pair of wire guide holding grooves 14p and 14q that open in opposite directions and that are formed into U shapes in cross section.

Still further, the modification of the shock absorbing member 14 shown in FIG. 4(d) comprises a pair of annular flange members 14r and 14s, which are rigid members, including elliptical cross-section through holes 14r1 and 14s1; and a cylindrical shock-absorbing member 14t which is connected between the pair of annular flange members 14r and 14s, which is formed of rubber or resin having a property equivalent to that of rubber, and which includes a through hole 14t1. By aligning each of the through holes 14r1, 14s1, and 14t1, a wire guide holding hole for guiding the wire 3 is formed.

Even by the shock absorbing members 14 shown in FIGS. 4(a) to 4(d), operational advantages that are substantially the same as those of the aforementioned shock absorbing member 14 are provided.

Although in each of the embodiment and modifications of the shock absorbing member 14 is provided at the bracket 1 side to which the buckle 2 and the buckle pre-tensioner 11 are mounted, in the present invention, the shock absorbing member 14 may be provided at the buckle 2 side.

Although in each of the embodiment and modifications the shock absorbing member 14 is applied to the seatbelt device 5 including the buckle pre-tensioner 11 which pulls in the buckle 2, the shock absorbing member 14 used in the present invention may be applied to any seatbelt device as long as the seatbelt device includes a pre-tensioner that pulls the seatbelt 7 by pulling in the pull-in member at the time of an emergency, such as a seatbelt device including a lap anchor pre-tensioner that pulls in the lap anchor 9.

As is clear from the above-described description, according to the seatbelt device of the present invention, when the pull-in member is pulled in by the operation of the pre-tensioner at the time of an emergency, impact energy produced when the pull-in member is stopped is absorbed by the shock absorbing mechanism, so that it is possible to further enhance shock absorption performance and to stop the pull-in member more effectively and gently.

In particular, according to one embodiment of the present invention, by absorbing impact energy produced when the pull-in member is stopped by the shock absorbing member, it is possible to greatly reduce impact force exerted on a member disposed near the pull-in member and affected by the pulling-in operation of the pull-in member.

Further, according to another embodiment of the present invention, since impact energy produced when the buckle and/or the lap anchor are stopped is absorbed, it is possible to further enhance shock absorption performance, and to stop the buckle and/or the lap anchor gently.

Further, according to another embodiment of the present invention, since the wire is held at a predetermined angle with respect to the direction in which the pre-tensioner pulls by the shock absorbing means, it is possible to prevent angle opening caused by the repulsive property of the wire and to set the buckle at a desired specified position. In addition, since the shock absorbing means has a wire holding capability, it is not necessary to use a special means for holding the wire at a predetermined angle, so that it is possible to, accordingly, reduce the number of component parts and simplify the structure.

The priority applications, Japanese Patent Application No. 2001-171513, filed on Jun. 6, 2001, and Japanese Patent Application No. 2002-093976, filed on Mar. 29, 2002, are hereby incorporated by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt device comprising:

a pre-tensioner for tensioning a seatbelt by moving a member connected to the seat belt; and a shock absorbing mechanism for absorbing shock resulting from stopping the movement of the member, wherein the shock absorbing mechanism includes two compressible members, the second compressible member surrounding the first compressible member.

2. The device of claim 1, wherein the two compressible members include accordion folds.

3. The device of claim 1, wherein the first compressible member includes a compressible portion and a rigid portion.

4. The device of claim 1, wherein the second compressible member is configured to begin compressing immediately upon movement of the moving member due to operation of the pre-tensioner in order to absorb shock due to movement of the member.

5. The device of claim 4, wherein the first mentioned compressible member is configured to begin compressing after the second compressible member has undergone a predetermined amount of compression.

6. The device of claim 4, wherein the compression of the second compressible member is limited by a rigid portion of the first compressible member.

7. The device of claim 4, wherein the second compressible member covers a wire connected to the pre-tensioner.

8. The device of claim 1, wherein the member connected to the seatbelt comprises a buckle.

9. The device of claim 1, wherein the member connected to the seatbelt comprises a lap anchor.

10. The device of claim 1, further comprising a wire connected to the member and connected to the pre-tensioner.

11. The device of claim 10, wherein the shock absorbing mechanism is configured to hold the wire at a predetermined angle from the direction in which the member moves.

12. A seat belt device comprising:

a pre-tensioner;

a movable member connected to the seat belt;

a wire connected to the pre-tensioner and the movable member, wherein during operation of the pre-tensioner the wire is pulled causing the movable member to move and the seat belt to be tensioned; and a shock absorbing mechanism configured to absorb shock associated with movement of the member;

wherein the shock absorbing mechanism includes two compressible members positioned around the wire.

13. A seat belt device comprising:

a pre-tensioner;

a movable member connected to the seat belt;

a wire connected to the pre-tensioner and the movable member, wherein during operation of the pre-tensioner the wire is pulled causing the movable member to move and the seat belt to be tensioned; and a shock absorbing mechanism configured to absorb shock associated with movement of the member;

wherein the shock absorbing mechanism includes two compressible members, the first compressible member surrounding the second compressible member and wherein the second compressible member includes a relatively rigid portion to limit the movement of the movable member.

14. The device of claim 1, wherein the shock absorbing mechanism limits the movement of the movable member.

15. The device of claim 1, wherein the shock absorbing mechanism is configured to prevent a direct collision between the member and a bracket connected to the pre-tensioner when the pre-tensioner is activated.

16. The device of claim 1, wherein the second compressible member comprises accordion folds.

17. The device of claim 16, wherein the first compressible member includes a compressible portion and a rigid portion.

* * * * *